United States Patent
Parker et al.

(10) Patent No.: US 9,282,083 B2
(45) Date of Patent: Mar. 8, 2016

(54) ENCRYPTION SYSTEM AND METHOD

(75) Inventors: Jeffrey C. Parker, Magnolia, TX (US); Valiuddin Y. Ali, Cypress, TX (US); James L. Mondshine, Cypress, TX (US)

(73) Assignee: Hewlett-Packard Development Company, L.P., Houston, TX (US)

( * ) Notice: Subject to any disclaimer, the term of this patent is extended or adjusted under 35 U.S.C. 154(b) by 678 days.

(21) Appl. No.: 12/574,288

(22) Filed: Oct. 6, 2009

(65) Prior Publication Data

US 2011/0081015 A1    Apr. 7, 2011

(51) Int. Cl.
*G06F 21/00* (2013.01)
*H04L 29/06* (2006.01)
*G06F 21/62* (2013.01)
*H04L 9/32* (2006.01)

(52) U.S. Cl.
CPC ........ *H04L 63/0471* (2013.01); *G06F 21/6236* (2013.01); *H04L 9/3226* (2013.01); *H04L 63/0485* (2013.01)

(58) Field of Classification Search
None
See application file for complete search history.

(56) References Cited

U.S. PATENT DOCUMENTS

| | | | |
|---|---|---|---|
| 5,920,893 A * | 7/1999 | Nakayama | G06F 3/0601 360/48 |
| 7,275,159 B2 | 9/2007 | Hull et al. | |
| 2004/0143733 A1 * | 7/2004 | Ophir et al. | 713/153 |
| 2007/0083559 A1 | 4/2007 | Harris et al. | |
| 2007/0198856 A1 | 8/2007 | Lee et al. | |
| 2008/0052439 A1 | 2/2008 | Young et al. | |
| 2008/0288782 A1 * | 11/2008 | Iyer | 713/186 |

OTHER PUBLICATIONS

Arthur Martin, $1,000,000 idea 001, USB Encryption Pass-Through Adapter, http://0xc9.blogspot.com/2009/03/1000000-idea-001-usb-encryption-pass.html, Mar. 25, 2009.

* cited by examiner

*Primary Examiner* — Izunna Okeke
(74) *Attorney, Agent, or Firm* — Hewlett-Packard Patent Dept.

(57) ABSTRACT

An encryption system can include a first port and a second port. A format translator can be coupled to the first port and the second port to translate a first header format of data received from the first port to a second header format of the second port. The format translator can translate the second header format of data received from the second port to the first header format. An encryptor can receive the data and encrypts the data received from the first port and decrypts the data received from the second port.

14 Claims, 6 Drawing Sheets

ENCRYPTION SYSTEM AND METHOD

BACKGROUND

Storage devices, such as external hard drives, may include confidential information. To protect the information on the storage device, the storage device may be encrypted so that the data stored on the storage device cannot be accessed without the encryption key. Encryption software can be installed on a computer to encrypt an external drive. Advanced Encryption Standard (AES) is a symmetric encryption standard. Symmetric-key algorithms are a class of algorithms for cryptography that use related, often matching, cryptographic keys for both decryption and encryption.

BRIEF DESCRIPTION OF THE DRAWINGS

Some embodiments of the invention are described with respect to the following figures.

DETAILED DESCRIPTION

To encrypt a storage device, software encryption programs can be used to encrypt a storage device that is connected to a computing device. The software encryption programs can use processor cycles to process the encryption algorithm for each file that is encrypted or decrypted. Using processor cycles to process the encryption algorithm prevents those processor cycles from being used for other tasks causing the other tasks to wait until the encryption algorithm cycle is finished.

Hardware encryption of a drive connected to a computing device does not use the computing device processor to perform encryption of a storage device. Hardware based encryption may include an integrated circuit that is specific to the storage device to encrypt the data as it is transferred to the storage device and decrypt the data as it is transferred from the storage device. For example, an encryption circuit may encrypt or decrypt files stored on a storage such as a USB flash drive. The encryption circuit can perform the encryption process in a way that is transparent to the user, and does not diminish transfer speeds or draw processor cycles away from other applications.

Data on external storage devices can be easily copied, viewed, tampered with, or destroyed if the data on the external storage is not encrypted. Software to encrypt the storage can take up processor cycles that cause the computer to take more time to perform other functions that are waiting for the encryption to finish. Drives with hardware encryption can encrypt data that on that drive that includes the encryption circuit but cannot encrypt data on other drives that are not connected to the encryption circuit. Drives that include a hardware encryption are more expensive to produce because of the hardware encryption circuit.

As storage devices increase in capacity or speed over a previous generation of storage devices the value of the previous generation can be diminished. In one embodiment an encryption system can be attached to storage devices with different connection ports to allow the storage device to be replaced or used with other storage devices without replacing the encryption circuit. The encryption system may also be attached to computing devices that include multiple connection ports.

In one embodiment, an encryption system can include a first port and a second port. A translation circuit can be coupled to the first port and the second port to translate a first header format of data received from the first port to a second header format of the second port and translate the second header format of data received from the second port to the first header format. An encryption circuit can receive the data to encrypt the data received from the first port and to decrypt the data received from the second port.

Figure 1:
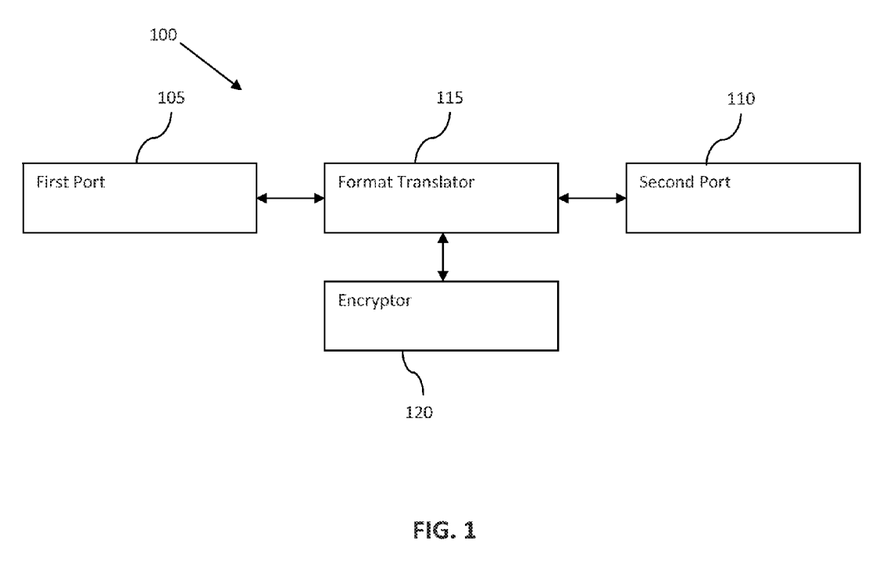
FIG. 1 is a block diagram of an exemplary embodiment of the invention.

Referring to the figures, FIG. 1 is a block diagram of an exemplary embodiment of the invention. An encryption system 100 can include a first port 105 and a second port 110. A format translator 115 can be coupled to the first port 105 and can be coupled to the second port 110 to translate a first header format of data received from the first port 105 to a second header format of the second port 110 and translate the second header format of data received from the second port 110 to the first header format. An encryptor 120 can receive the data and encrypt the data received from the first port 105. The encryptor 120 can decrypt the data received from the second port 110.

In one embodiment, the first port can connect to a computing device. The computing device may be for example a portable computer, a desktop computer, a personal digital assistant, a server computer or another computing device. In one embodiment, the second port can connect to a storage device. The storage device may be for example a solid state drive, a hard disk drive, an optical drive or another storage device.

The encryption system can receive data through the first port 105 in a first format according to type of port. The data format may include for example a header packet, a data packet, and a status packet or the data format may include an acknowledge packet. The format translator 115 can translate the data received from the first port to be transmitted from the second port if the format of the data received from the first port is different from the format of the data that is sent from the second port. For example, the first port may be connected to the universal serial bus (USB) port of a computing device with the data received by the first port in a header packet, data packet, and status packet format. The second port may be connected to an IEEE 1394 port on a storage device for example, and the format translator 115 converts the header packet, data packet, status packet format of the USB port to a format of the IEEE 1394 port.

In one embodiment the encryption system receives initial data from the first or the second port with information about the format of the connection. For example, an IEEE 1394 connection can establish connections using a connection manager. In an IEEE 1394 connection any node may act as a connection manager. A connection can be established by sending a sequence of connection request packets. The connection request packets can contain the information needed for one device to learn the address of the plug created on the connected node.

The encryption system 100 can include an encryptor 120 to encrypt the data received from the first port 105. The encryptor 120 can for example encrypt the data using an AES, blowfish or another encryption system. A data packet received by the encryption system 100 may correspond to a header packet or an acknowledge packet that may not be encrypted by the encryptor 120. The encryptor 120 encrypts the data packet which is the data that a user intends to protect and does not encrypt the header packet that describes the data that is being transferred. The encryptor 120 may also decrypt the data packet that is received by the second port. The data packet received by the second port can include a header packet that is not encrypted with a data packet that is encrypted. Data that is included in the data received by the second port 110 that is not encrypted may be translated by the format translator before sending from the first port 105.

In one embodiment the format translator 115 may remove any formatting added to transmit data through one of the first port or the second port. The data packet, the remaining data after any formatting has been removed, can be sent to the encryptor 120. The encryptor 120 can encrypt an unencrypted data packet or decrypt an encrypted data packet. The data packet can be sent back to the format translator to have the data put in a format for the port that the data may be transmitted from.

Figure 2:
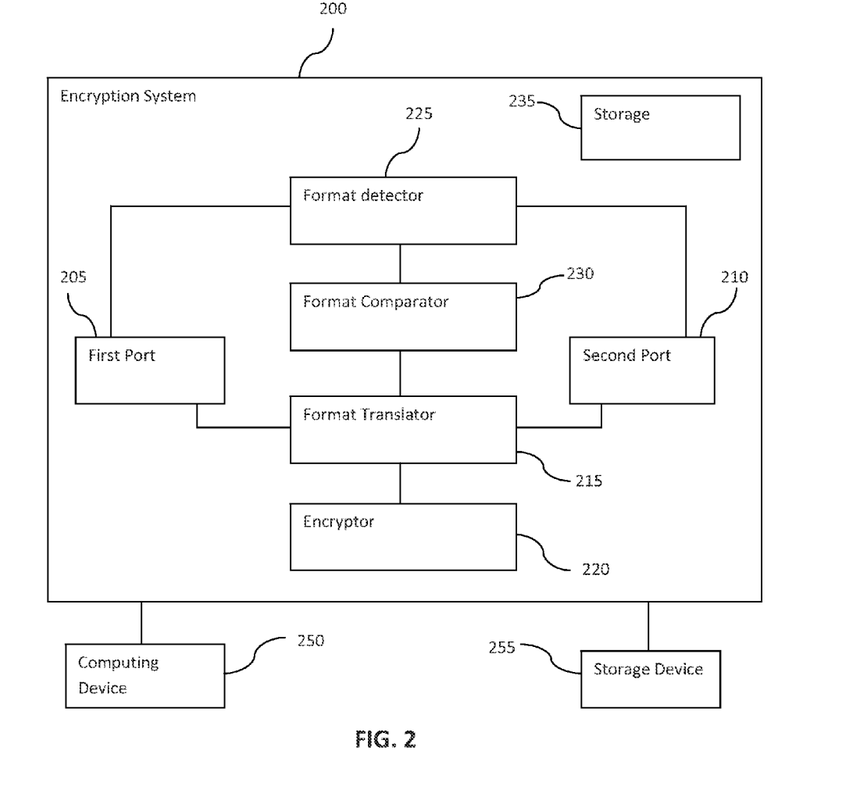
FIG. 2 is a block diagram of an exemplary embodiment of the invention.

FIG. 2 is a block diagram of an exemplary embodiment of the invention. An encryption system 200 can include a format detector 225, a format comparator 230, a format translator 215, and an encryptor 220. The format detector 225 can determine a first data format of a first connection to a first port 205. The format detector 225 can also determine a second data format of a second connection to a second port 210.

The format comparator 230 can compare the first data format and the second data format to determine if the first data format and the second data format are different. A format translator 215 can receive data in a first data format and translate the data to a second data format if the first data format and the second data format are different. An encryptor 220 can encrypt the data that is transmitted from the first port to the second port and decrypt data transferred from the second port to the first port.

A computing device 250 for example can be connected to the first port 205. In one embodiment, the first port 205 can communicate in multiple formats. For example, the first port 205 can connect to a port on the computing device 250 using one of the multiple formats according to the format of the port on the computing device.

A storage device 255 for example can be connected to the second port 210. In one embodiment, the second port 205 can communicate in multiple formats. For example, the second port can connect to a storage device 255 using one of the multiple formats according to the format of the port on the storage device.

The format detector 225 can determine a first data format of a first connection to a first port 205. In one embodiment the first data format is determined by which pins of the first port 205 are receiving a signal. In an alternative embodiment the first data format is determined by the inclusion of packets in the data that is received by the encryption system, for example a header packet can be used to determine the format of the data in one embodiment.

If the format comparator 230 determines the first data format and the second data format are different the data can be transferred to a format translator 215. The format translator 215 can receive data in the format of the first port and output data in the format of the second port, in one embodiment. In one embodiment the format translator 215 does not translate the data from the first port because the format comparator 230 determines that the format of the first and the second ports are not different.

An encryptor 220 can encrypt the data that is transmitted from the first port to the second port. The encryption circuit can use symmetric or asymmetric encryption for the data. The encryptor 220 can encrypt data that is received by the encryption system from the computing device to be stored on the storage device. The encryptor 220 can decrypt data that is requested by the computing device from the storage device.

The encryption system may include a storage 235 to store for example encryption keys, information about data formats and headers, firmware and authentication software. The storage 235 can be a non-volatile memory, for example a programmable read only memory or a flash memory.

Figure 3:
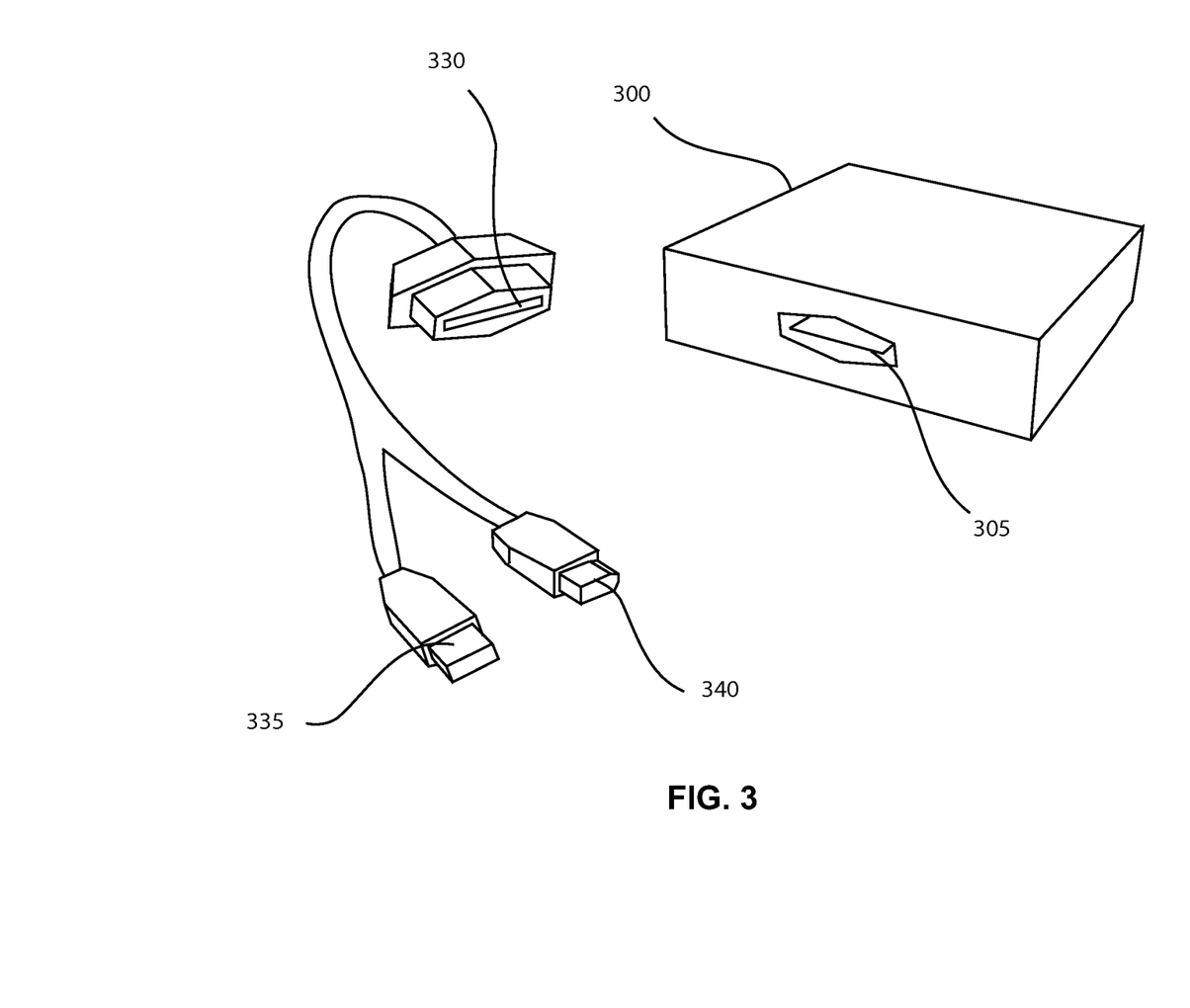
FIG. 3 is a system comprising an exemplary embodiment of the invention.

FIG. 3 is a system comprising an exemplary embodiment of the invention. An encryption system 300 can include a first port 305. The first port 305 may be able to accept a connector 330. The connector 330 may be connected to a cable that includes a connector or may include multiple connectors 335 and 340 on the opposite end of the cable from the connector 330. For example connector 335 may include 4 terminals and connector 340 may include 6 terminals and the connector 330 may include enough terminals so that the connector 335 and the connector 340 are both coupled to the encryption system at the same time. In one embodiment the port 305 may include more terminals than the connector 330 can connect to if the port 305 include supports more connectors than the cable includes. For example if the port 305 includes terminals for both USB and IEEE 1394 the connector 330 may only include the terminals for USB if the other end of the cable only has a USB connector such as connector 335 and does not include a IEEE 1394 connector such as connector 340.

Figure 4:
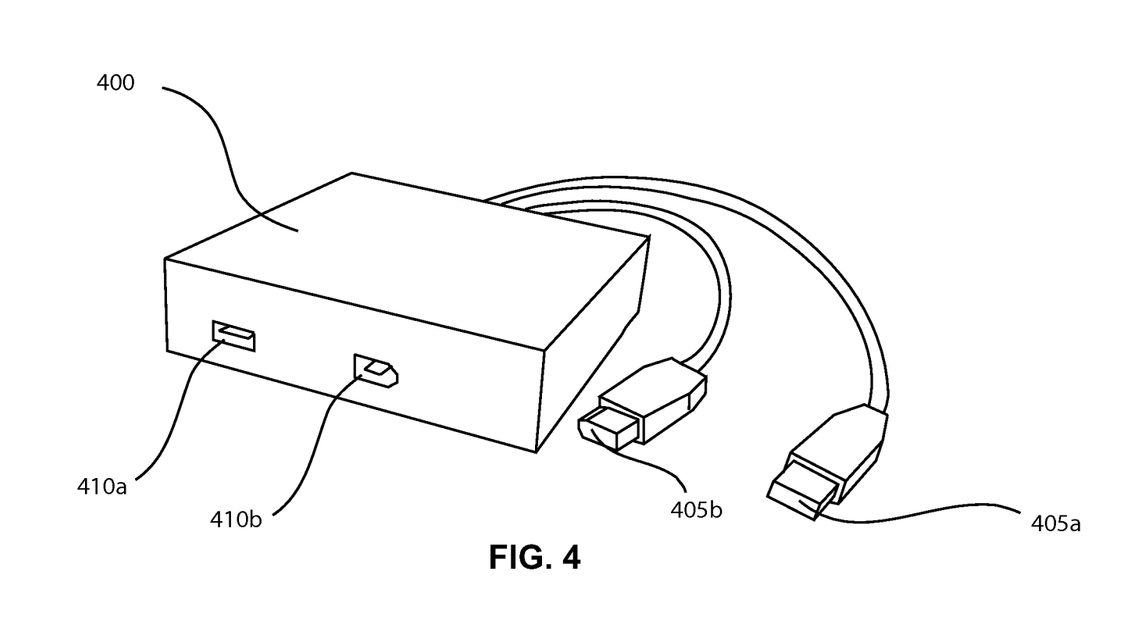
FIG. 4 is a system comprising an exemplary embodiment of the invention.

FIG. 4 is a system comprising an exemplary embodiment of the invention. An encryption system 400 in one embodiment may include first ports 405*a* and 405*b* and may include second ports 410*a* and 410*b*. The first ports 405*a* and 405*b* can be connected to a port on a computing device. The second ports 410*a* and 410*b* can connect to a storage device. The second ports 410*a* and 410*b* may be able to be connected to cables for USB and IEEE 1394 for example.

Figure 5:
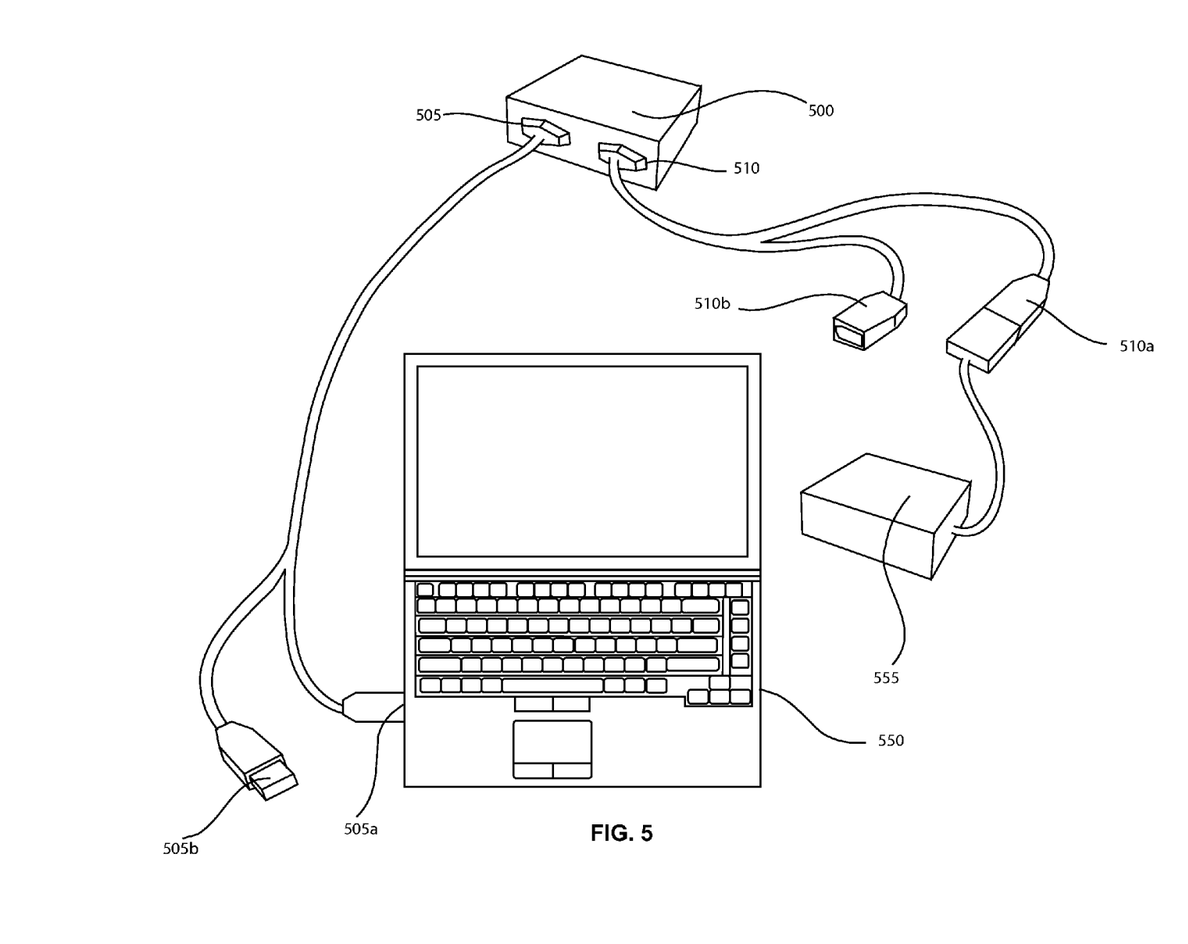
FIG. 5 is a device comprising an exemplary embodiment of the invention.

FIG. 5 is a device comprising an exemplary embodiment of the invention. An encryption system 500 can include a first port 505 and a second port 510. The first port 505 can connect to a cable that includes connectors 505*a* and 505*b* for connecting to a computing device 550.

The second port 510 can connect to a cable that includes connectors 510*a* and 510*b* for connecting to a storage device 555. The storage device can connect to the encryption system 500 using one of the connectors 510*a* and 510*b*. Two connectors are shown for each of the cables however the cables may include more or less connectors. The storage device 555 may be connected to the encryption system 500 using an IEEE 1394 port for example.

Data can be sent from the computing device 555 thought the cable to the encryption system 500. The computing device can format the data that is being sent according to the port that is sending the data. For example if the port on the computing device is a USB port the data sent to the encryption system 500 includes a header packet, the data packet and the status packet. The encryption system 500 can remove the formatting, for example the header and the status packet, from the data that is received from the first port 505. The data packet without the formatting can be encrypted by the encryption system 500 and the encrypted data can be formatted to be sent to the port of the storage device 555. The storage device 555 may not be aware that the data packet had been transmitted using a different format before the data that was received by the storage device 555.

The storage device 555 can also send an encrypted data packet to the encryption system if the data is requested by the computing device 550. The encryption system 500 can decrypt the data packet from the storage device 555 before sending the data to the computing device 550.

In one embodiment the encryption system uses symmetric encryption. If the encryption system uses symmetric encryption the same key must be used by the encryption system to encrypt and decrypt the data. The encryption system may generate the key based on user authentication for example. The user authentication can be handled by the computing device, for example by a password. The user authentication may also be by a biometric sensor either in the computing device, the encryption system or the storage device. The biometric sensor may be for example a finger print sensor, voice recognition, optical recognition or another form of biometric sensor. If the biometric sensor is included on the encryption system, the encryption system may include some indication of its state. For example there may be a light emitting diode (LED) that lights up when the encryption system has authenticated a user. The encryption system may generate the key based on the user authentication or the key may have been already generated and the user authentication allows use of the key for encryption or decryption.

If the user authentication is done by the computing device the software that performs the authentication can be pre-loaded on the computing device in one embodiment or the software may be stored on the encryption system and executed by the computer. If the software is stored on the encryption system the software may be executed either when the encryption system is connected to the computing device, when the storage device is connected to the encryption system, or when requested by the computing device for example in response to a user input.

In one embodiment the encryption system that encrypts the data on the drive is used to decrypt the data on the storage device and if another encryption system is used to attempt to decrypt the data on the storage device the data is not decrypt able. In one embodiment the encryption system uses asymmetric encryption where other encryption systems can encrypt the data and only one of encryption system is able to decrypt the data on the storage device. Alternatively an encryption system can encrypt the data and multiple other encryption system can decrypt the data on the storage device.

In one embodiment software can be used to decrypt the data on the drive if the encryption system is not available. For example if the storage can be connected to the computing device without the use of the encryption system then software loaded on the computing device may be able to decrypt the data on the storage if the software can use the same encryption algorithm as the encryption system used to encrypt the data on the storage device.

In one embodiment a storage device can receive encrypted data from the encryption system or may receive unencrypted data from the encryption system. For example the computing device may send a signal to the encryption system that the data being stored on the drive is not data that is going to be encrypted by the encryption system so that the drive can be used to store unencrypted data. The unencrypted data can be accessed by connected the storage device to the computing device without connecting the device to the encryption system. The computing device can also store unencrypted data on the storage device if the storage device is connected to the computing device without the encryption system.

In one embodiment the encryption system may also include upgradeable firmware. The firmware may be instructions that control the operation of a component of the encryption system. The firmware may be upgraded by connecting the encryption system to a computing device and installing the firmware on the encryption system.

Figure 6:
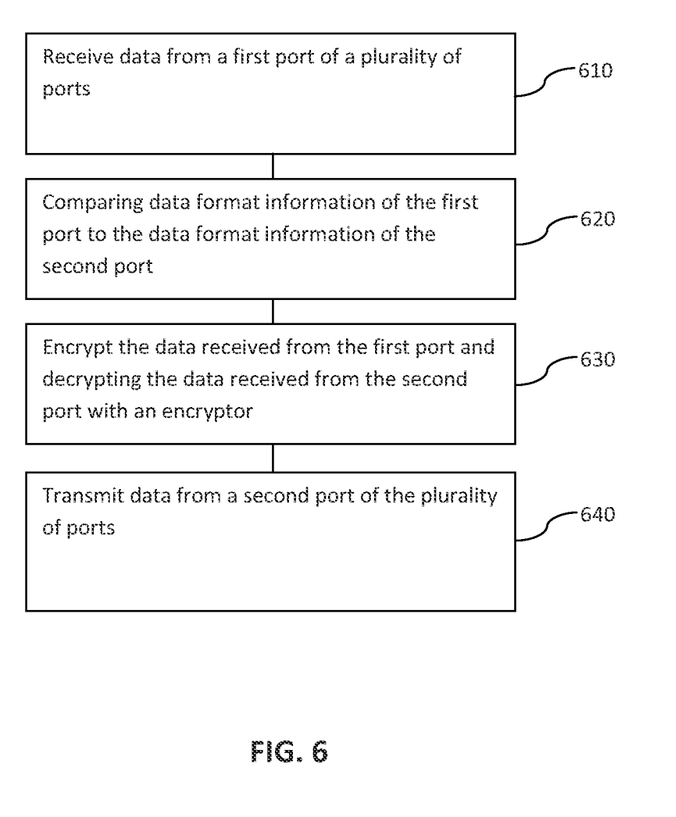
FIG. 6 is a flow chart of a method according to an exemplary embodiment of the invention.

FIG. 6 is a flow chart of a method according to an exemplary embodiment of the invention. A method of encrypting data in a storage device can receive data from a first port of a plurality of ports (at 610). The data format information of the first port can be compared to the data format information of the second port (at 620). The data received from the first port can be encrypted and the data received from the second port can be decrypted with an encryptor (at 630). The data can be transmitted from a second port of the plurality of ports (at 640). The data format information retrieved from the storage can be information that may include information on the format of the header that can be added to the data transmitted from the second port. The formatting of the data can be selected from, for example, the formatting of USB, 1394, and SATA.

For the encryption system to encrypt or decrypt the data the user of the system may be authenticated. The authentication may be by prompting the user using a computing device. The computing device can execute authentication software stored on the encryption system in one embodiment. The prompt by the authentication software may be to enter a password. The password may be transmitted to the encryption system and the encryption system may generate a key from the password. The computing device may be connected to the first port and the storage device may be connected to the second port, for example.

In one embodiment the encryption key is generated in the encryption system. The encryption key may be stored in the encryption system or the encryption key may be disregarded after encrypting the data, if the key is disregarded after encrypting the data the key can be regenerated from authentication of the user.

The techniques described above may be embodied in a computer-readable medium for configuring a computing device to execute the method. The computer readable media may include, for example and without limitation, any number of the following: magnetic storage device media including disk and tape storage device media; optical storage device media such as compact disk media (e.g., CD-ROM, CD-R, etc.) and digital video disk storage device media; holographic memory; nonvolatile memory storage device media including semiconductor-based memory units such as FLASH memory, EEPROM, EPROM, ROM; ferromagnetic digital memories; volatile storage device media including registers, buffers or caches, main memory, RAM, etc. Other new and various types of computer-readable media may be used to store and/or transmit the software modules discussed herein. Computing devices may be found in many forms including but not limited to mainframes, minicomputers, servers, workstations, personal computers, notepads, personal digital assistants, various wireless devices and embedded systems, just to name a few.

In the foregoing description, numerous details are set forth to provide an understanding of the present invention. However, it will be understood by those skilled in the art that the present invention may be practiced without these details. While the invention has been disclosed with respect to a limited number of embodiments, those skilled in the art will appreciate numerous modifications and variations therefrom. It is intended that the appended claims cover such modifications and variations as fall within the true spirit and scope of the invention.

What is claimed is:

1. An encryption system comprising:
a first port and a second port;
a processor; and a non-transitory storage medium storing instructions executable on the processor to:
compare a first data format of a first connection of a first device to the first port, with a second data format of a second connection of a second device to the second port, the first and second devices being external of the encryption system;
detect the first data format of the first connection of the first device to the first port based on detecting that a first set of pins of the first port are receiving signals;
detect a different data format of a connection of a device to the first port based on detecting that a second, different set of pins of the first port are receiving signals;
in response to determining that the first data format is different from the second data format, translate the first data format of data received from the first port to the second data format of the second port, and translate the second data format of data received from the second port to the first data format;
in response to determining that the first data format is the same as the second data format, not translating between the first data format and the second data format for data received at the first and second ports; and
encrypt data received from the first port and decrypt data received from the second port.

2. The encryption system of claim 1, wherein the first device is a computing device, and the second device is a storage device.

3. The encryption system of claim 1, wherein the first port is able to communicate according to multiple data formats.

4. The encryption system of claim 3, further comprising a first cable to connect the first port to the first device, wherein the first cable includes a connector connected to the first port and multiple connectors, one of the multiple connectors for connecting to the first device.

5. The encryption system of claim 4, wherein each of the multiple connectors uses a respective different header format.

6. The encryption system of claim 1, wherein the first port includes terminals for a first communication protocol, and terminals for a second communication protocol different from the first communication protocol.

7. The encryption system of claim 6, wherein the first communication protocol comprises a universal serial bus (USB) protocol.

8. A method comprising:
comparing, by a device comprising a first port and a second port, a first data format of a first connection of a first external device to the first port, with a second data format of a second connection of a second external device to the second port, the first and second external devices being external of the device;
detecting the first data format of the first connection of the first external device to the first port in response to detecting that a first set of pins of the first port are receiving signals;
detecting a different data format of a connection of an external device to the first port in response to detecting that a second, different set of pins of the first port are receiving signals;
in response to the comparing determining that the first data format is different from the second data format, translating, by the device, the first data format of data received from the first port to the second data format of the second port, and translating the second data format of data received from the second port to the first data format;
in response to the comparing determining that the first data format is the same as the second data format, not translating between the first data format and the second data format for data received at the first and second ports;
encrypting, by the device, data received from the first port; and
decrypting, by the device, data received from the second port.

9. The method of claim 8, wherein detecting the first format is performed by a format detector in the device.

10. The method of claim 8, further comprising connecting the first port to the first external device that is a computing device, and connecting the second port to the second external device that is an external storage device.

11. The method of claim 8, wherein the first data format is selected from among a universal serial bus (USB) format, an IEEE 1394 format, and a SATA format.

12. The method of claim 8, further comprising generating a key in the device to perform the encrypting.

13. The method of claim 12, further comprising authenticating a user to generate the key.

14. A non-transitory computer readable storage medium storing instructions that upon execution cause a device comprising a first port and a second port to:
compare a first data format of a first connection of a first external device to the first port, with a second data format of a second connection of a second external device to the second port, the first and second external devices being external of the device;
detect the first data format of the first connection of the first external device to the first port in response to detecting that a first set of pins of the first port are receiving signals;
detect a different data format of a connection of an external device to the first port in response to detecting that a second, different set of pins of the first port are receiving signals;
in response to the comparing determining that the first data format is different from the second data format, translate the first data format of data received from the first port to the second data format of the second port, and translating the second data format of data received from the second port to the first data format;
in response to the comparing determining that the first data format is the same as the second data format, not translate between the first data format and the second data format for data received at the first and second ports;
encrypt data received from the first port; and
decrypt data received from the second port.

* * * * *